United States Patent [19]
Landreneau

[11] Patent Number: 6,082,307
[45] Date of Patent: Jul. 4, 2000

[54] INTERCHANGEABLE GROOMING APPARATUS FOR ANIMALS

[76] Inventor: Randall L. Landreneau, 906 Osceola Ave N., Clearwater, Fla. 33775

[21] Appl. No.: 09/221,923

[22] Filed: Dec. 28, 1998

Related U.S. Application Data

[63] Continuation-in-part of application No. 08/505,107, Jul. 21, 1995, Pat. No. 5,862,780.

[51] Int. Cl.[7] .......................... A01K 13/00; A45D 24/42
[52] U.S. Cl. .......................... 119/616; 119/625; 132/119
[58] Field of Search .................................. 119/614, 615, 119/616, 625, 626, 627, 633; 132/119, 126, 139, 141, 142, 148, 152, 160, 219; 300/20; 294/26, 86.4, 106

[56] References Cited

U.S. PATENT DOCUMENTS

| | | | |
|---|---|---|---|
| 997 | 11/1838 | Sanford | 119/625 |
| D. 206,527 | 12/1966 | Montecalvo | 132/119 |
| 282,338 | 7/1883 | Magruder | 119/633 |
| 2,562,465 | 7/1951 | Kassel | 132/119 |
| 3,205,903 | 9/1965 | D'Avanzo | 132/139 |
| 5,636,646 | 6/1997 | Zito | 132/152 |

*Primary Examiner*—Peter M. Poon
*Assistant Examiner*—Elizabeth Shaw
*Attorney, Agent, or Firm*—Ronald E. Smith; Smith & Hopen, P.A.

[57] ABSTRACT

An improved apparatus for grooming animals, particularly for the removal of loose hair and hair that is soon to become loose. In a first embodiment, a base has one or more slots that slideably receive a corresponding number of comb extensions. The comb extensions are transversely disposed relative to a longitudinal axis of the base, are longitudinally spaced apart from one another, and are oriented at a common angle relative to the base. In a second embodiment, plural rows of transversely disposed tines are integrally formed with the base. In a third embodiment, the base and comb extensions are integrally formed with one another and the base is snap-fittingly engaged to a clip member having a handle that is integrally formed with it. Further embodiments include plural base sections that interlock with one another or which are interlocked together by a separate locking member to collectively form a base, wherein each base section carries a row of tines.

20 Claims, 8 Drawing Sheets

6,082,307

INTERCHANGEABLE GROOMING APPARATUS FOR ANIMALS

This application is a continuation-in-part of copending U.S. patent application Ser. No. 08/505,107 now U.S. Pat. No. 5,862,780, entitled "GROOMING TOOL FOR PETS," filed by the present inventor on Jul. 21, 1995. That disclosure is incorporated hereinto by reference.

BACKGROUND OF THE INVENTION

1. Field of the Invention

This invention relates, generally, to an apparatus used for grooming animals. More particularly, it relates to an improved apparatus for the removal of shedding and loose hair from animals as well as for the grooming of living hair.

2. Description of the Prior Art

Animal hair varies in length and thickness. This variation occurs between animals of differing species or breeds, and it can also occur in a single animal from season to season. When an animal's hairs are fine and closely spaced, the coat of hair is called fur; when soft, kinked, and matted together, the coat is called wool. Coarse, stiff hairs are called bristles.

In the proper care of animals, and in particular mammalian pets, it is necessary to periodically remove disconnected and loose hair from the animal.

There are a number of pet grooming devices directed towards loose hair removal. For a grooming device to be effective in removing shedding and loose hair, it must not only remove the hair that is already loose or disconnected from the epidermis of the animal, but also hair that is still connected to the epidermis but is soon to become disconnected. It is the hair follicles that are about to become loose that are the primary problem because soon after the animal is brushed or combed, these hair follicles will become loose requiring additional combing or brushing for them to be removed.

The effectiveness of the tools of the prior art in the removal of loose and shedding hair is limited by the amount of hair with which the operative parts of the device come into contact during use. The effectiveness also depends upon the amount of friction between the device and the hair follicles, or pulling force, created as the device is being used.

Manual removal of the hair using only human hands is generally undesirable. Simple stroking of the animal fails to penetrate the coat sufficiently to pull out a significant portion of loose hair follicles. Furthermore, pulling on the coat to remove hair about to come loose is painful and unpleasant to the animal.

A brush generally refers to a device comprising bristles fastened to a handle. The typical brush has some effectiveness in removing loose and shedding hair. The closer the bristles are together, the more friction occurs between the hair follicles and the brush bristles, and the more loose and shedding hair the device will remove. However, the closer the bristles are together, the harder it is to penetrate the coat of hair of the animal. If the coat of hair is not fully penetrated, the bristles of the brush do not come into contact with enough of the hair follicles that need to be removed.

A comb generally refers to a thin, toothed strip used to smooth, arrange, or fasten hair. The typical comb has some effectiveness in removing loose and shedding hair. The closer the teeth of the comb are together, the greater the friction between the teeth of the comb and the hair follicles, causing increased removal of shedding and loose hair. As with brushes, there is a limit to how close the teeth of a comb can be together and still allow effective penetration of the coat of hair. In addition, a typical comb has only one row of teeth, limiting the amount of contact with hair follicles during its use.

Previous combing devices are described in U.S. Pat. No. 3,893,424 to Casler ('424 patent); U.S. Pat. No. 4,799,457 to Gordon ('457 patent); and U.S. Pat. No. 3,574,885 to Jones ('885 patent).

The '424 patent to Casler describes a comb with two rows of teeth angularly directed so that one tooth crosses and contacts another tooth. An animal's hair will pass between those teeth and the pressure between the teeth pulls at the hair and removes it if loose. While this tool does have pulling force, it has limited contact with hair follicles due to having two rows of teeth coming together at only one effective contact point.

The '457 patent to Gordon describes an elongated comb strip with V-shaped teeth on one side and parallel teeth on the other with mating handle members at either end of the strip so that the device can be bent into a closed loop teardrop shape for use. This device has the same characteristic as the other earlier combs, namely limited contact with hair follicles due to having one row of teeth and limited pulling force.

The '885 patent to Jones describes a brush designed to be attached to a vacuum cleaner tube enabling suction of loose hairs and other particles from the coat of a pet. Another device in use is a glove with the underside coated with a surface of soft, sticky rubber containing short conical protrusions. Both of these devices are limited in their effectiveness in removing loose hair by the limited amount of hair follicles that they come into contact with during use and the limited amount of friction between them and the hair follicles.

In the pending patent application by the present inventor, the claims recite a base having multiple rows of tines disposed at a common acute angle to the base on both sides thereof. A base having multiple rows of tines disposed at a common acute angle on a single side of the base is not recited. The claims also recite panels that carry such rows of tines where the panels are attached to a base, but the attachment means is quite specific.

Polymer based materials have several beneficial properties suitable for pet grooming tools. Polymers are durable, resistant to oxidation and are easily disinfected. Furthermore, an efficient method of producing combs is through thermoplastic injection molding whereby polymer resin is heated until it is liquefied and then injected into a comb-shaped cavity where it is cooled so that the polymer solidifies. The mold product is then ejected from the mold. However, this method is expensive and it is difficult to create thermoplastic injection molds for large grooming tools. Large mold objects take longer to cool and therefore lengthen the production cycle. A one-piece polymer comb does not provide the ability to interchange various comb extensions to suit a particular animal's coat. Furthermore, once a tine breaks on a one-piece polymer comb, the effectiveness of the comb is forever compromised.

Consequently, there is a need in the art for an improved pet grooming tool that provides penetration of the coat, contact with a significant portion of hair follicles and enough friction to remove loose hair still attached to the epidermis of the animal.

A need also exists for a tool that can be adjusted to deal with variations in the coats of different animals and variations in the coat of one animal from season to season.

There is a further need in the art for a multi-part grooming tool that utilizes a base separate from one or more comb extensions, all of which can be individually manufactured in separate polymer injection mold cavities.

However, in view of the prior art at the time the present invention was made, it was not obvious to those of ordinary skill in the pertinent art how the identified needs could be fulfilled.

SUMMARY OF THE INVENTION

The present invention solves significant problems in the art. It provides an animal grooming device that generates sufficient friction or pulling force between the parts in contact with the hair follicles and the hair follicles to effectively pull out hair follicles that are about to shed but not yet disconnected from the epidermis. It also removes hair follicles that are already disconnected from the epidermis.

In a first embodiment, the base of the device contains one or more transversely disposed slots that slideably receive a corresponding comb extension angled less than ninety degrees from the base. This enables differing comb extensions to be slid into the base so that multiple animals may be groomed and so that a single animal may be groomed as the seasons of the year change.

A plurality of comb extensions are produced using thermoplastic injection molding which are slideably received within respective slots in a base. This permits a variety of comb configurations which may be optimized for the particular animal to be groomed and for a particular season of the year. Furthermore, should a comb extension break, it can be easily removed from the base and replaced at a minimal cost.

More particularly, a first embodiment of the animal grooming apparatus for pets includes a base having at least one transversely disposed slot for slideably receiving a corresponding comb extension. The comb extension has a plurality of tines angled less than ninety degrees from the base. The at least one slot includes a plurality of slots for receiving respective comb extensions, and each of the comb extensions is constructed of polymer material. The base is also preferably constructed of polymer material.

The preferred angle of each comb extension is between 25 to 60 degrees from said base, with 30 degrees believed to be optimal.

A second embodiment of the invention may include a cleaning tool having a handle, a plurality of cleaning tines extending from the handle, and an aperture formed in a side of the base that slideably receives the cleaning tool. The cleaning tines are dimensioned to pass through the tines of the comb extension to clean the comb extension.

Significantly, the slots of the first embodiment are eliminated in this second embodiment. Thus, each transversely disposed row of tines is formed integrally with the base of the tool.

An elongated handle may also be rigidly fixed to the base, and the base may have a concave structure. The tines extending from the comb extensions may be tapered so that the circumference of the tines is greater proximate towards the base. An additional set of slots and comb extensions may be provided on the opposite face of the base.

A third illustrated embodiment includes a clip member having a handle integrally formed therewith and a separate base member having comb extensions integrally formed therewith. The clip member and the base member are interconnected to one another by a snap-fit engagement means. This enables the user to change tines for differing animals or for a single animal as the seasons change.

In a fourth embodiment, a row of tines is integrally formed with a base section, and multiple base sections are releasably attachable to one another to collectively form a base member. In this way, any number of rows of tines may be linked to one another to form a comb base member of any length having as many rows of tines as may be desired or required for a particular application.

In a fifth embodiment, a row of tines is integrally formed with a base section, and multiple base sections are interlocked to one another by an interlocking means that is not an integral part of each base section.

In each embodiment, each comb extension or row of tines may be thought of as a comb means. In all embodiments, a plurality of transversely disposed comb means are disposed in longitudinally spaced relation to one another.

It is an object of the present invention to provide a grooming device for animals that effectively removes loose hair.

Another object is to remove hair that will be shed but is not yet disconnected from the epidermis.

Another object is to facilitate a hair removal process for animals which is not uncomfortable or painful to the animal being groomed.

Yet another object is to provide a tool having easily changeable tines so that it may be used on differing animals and on a single animal at different times of the year.

An advantage of the invention is that production costs are lowered for manufacturing the device using thermoplastic injection molding. By providing individual comb extensions that slide into slots in a base, as in the first embodiment, the size of the mold cavity is reduced, thereby speeding production of the parts. The other embodiments also enable the use of small mold cavities.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
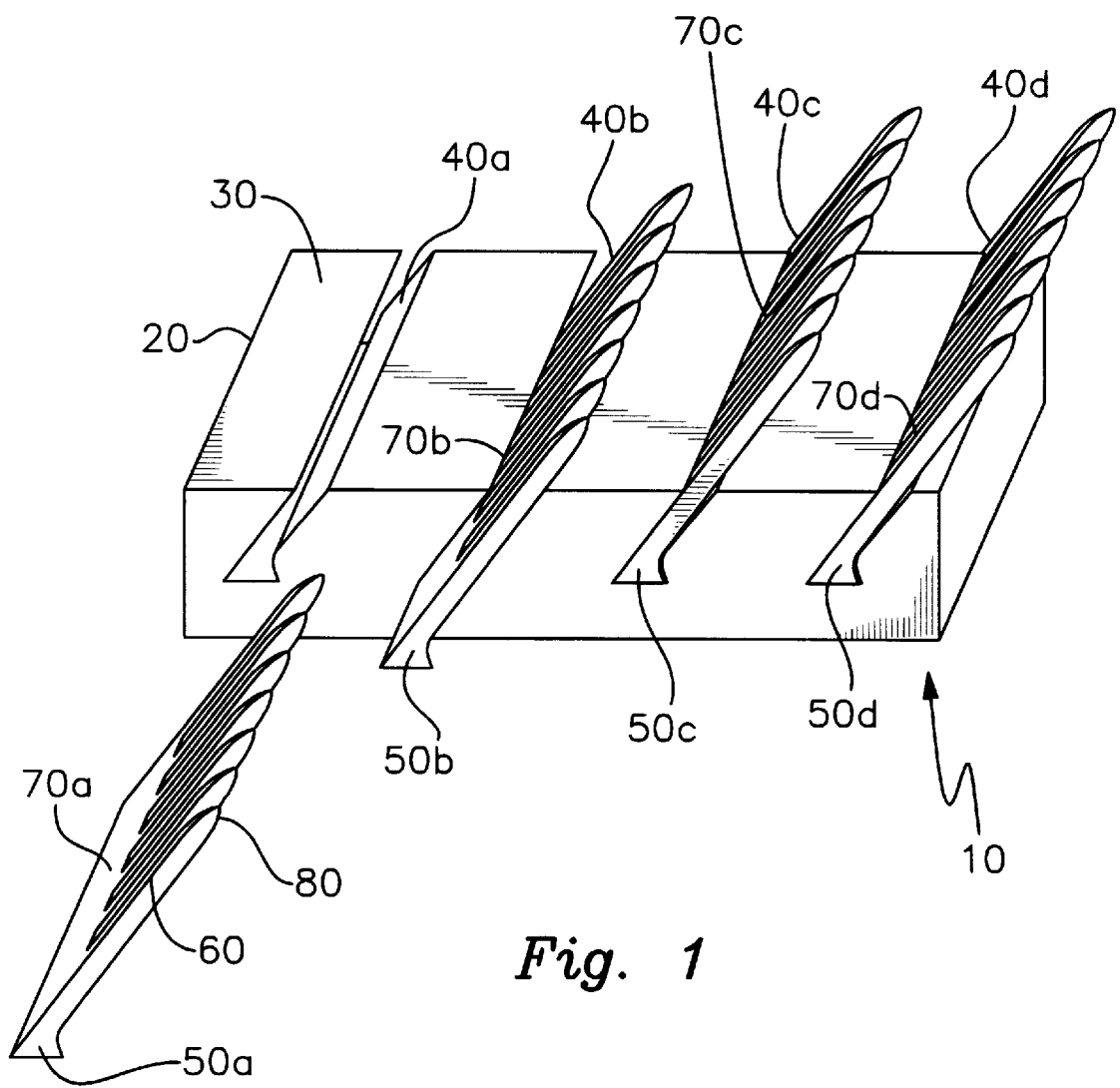
FIG. 1 is a perspective view of a first embodiment of the animal grooming device according to the invention.

Referring initially to FIG. 1, it will there be seen that a first illustrative embodiment of the present invention is denoted by the reference number 10 as a whole. Base 20 is of generally parallelepiped construction, having a predetermined longitudinal and transverse extent. Base 20 has at least one transversely disposed slot 40a extending substantially the width of face 30. A plurality of transversely disposed, longitudinally spaced apart slots 40a–d respectively slideably receive a corresponding number of comb extensions 50a–d, each of which extends from a backbone 70a–d. Comb extensions 50a–d are set at an angle of less than ninety degrees to face 30 and are transversely disposed with respect to a longitudinal axis of base 20 and are longitudinally spaced apart from one another. The angle may range from 25 to 60 degrees; 30 degrees is considered optimal but empirical studies could suggest a different angle.

Tines 60 of each comb extension extend from a solid backbone 70a–d that protrudes from base 20 at the same angle as the comb extensions 5a–d. The respective tips 80 of tines 60 are rounded enough not to be sharp to damage the epidermis of the animal.

Figure 2:
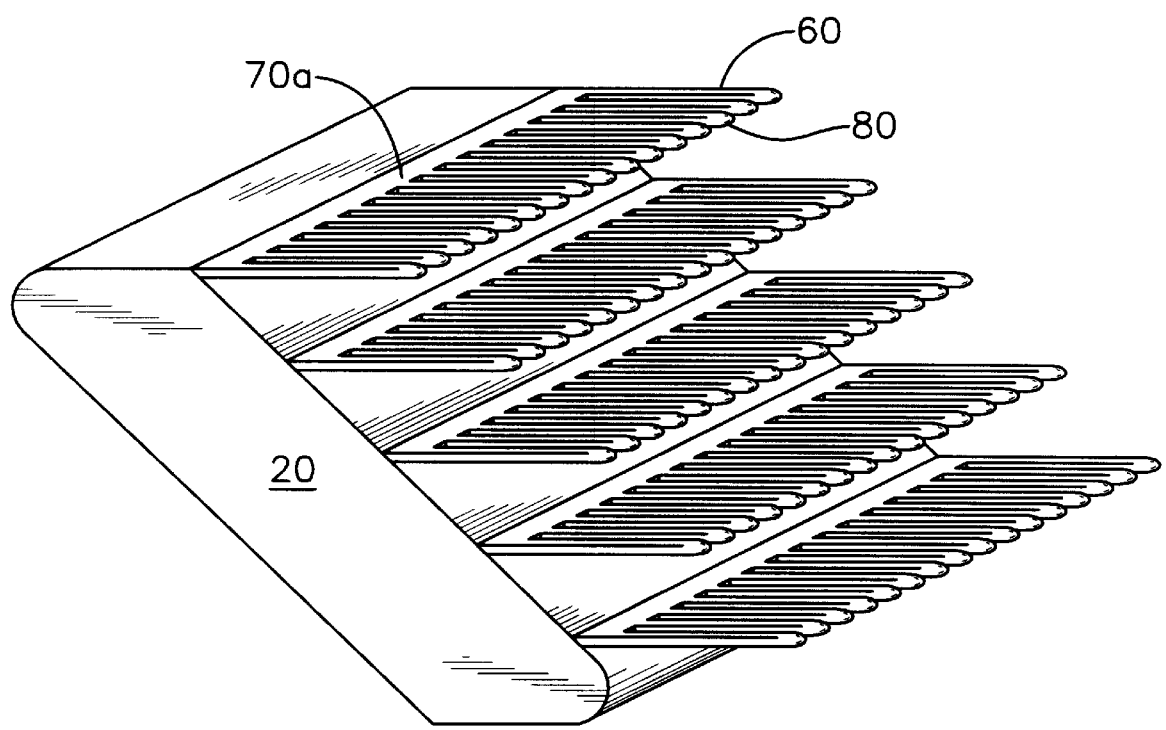
FIG. 2 is a perspective view of a second embodiment of the invention.

The preferred embodiment of the invention is disclosed in FIG. 2. Each row of transversely disposed tines 60 is integrally formed with base 20, and the rows are longitudinally spaced from one another. The preferred angle between each row of tines and base 20 is thirty degrees. There are no slots 40a–d and no separately formed comb extensions 50a–d in this embodiment.

Figure 2A:
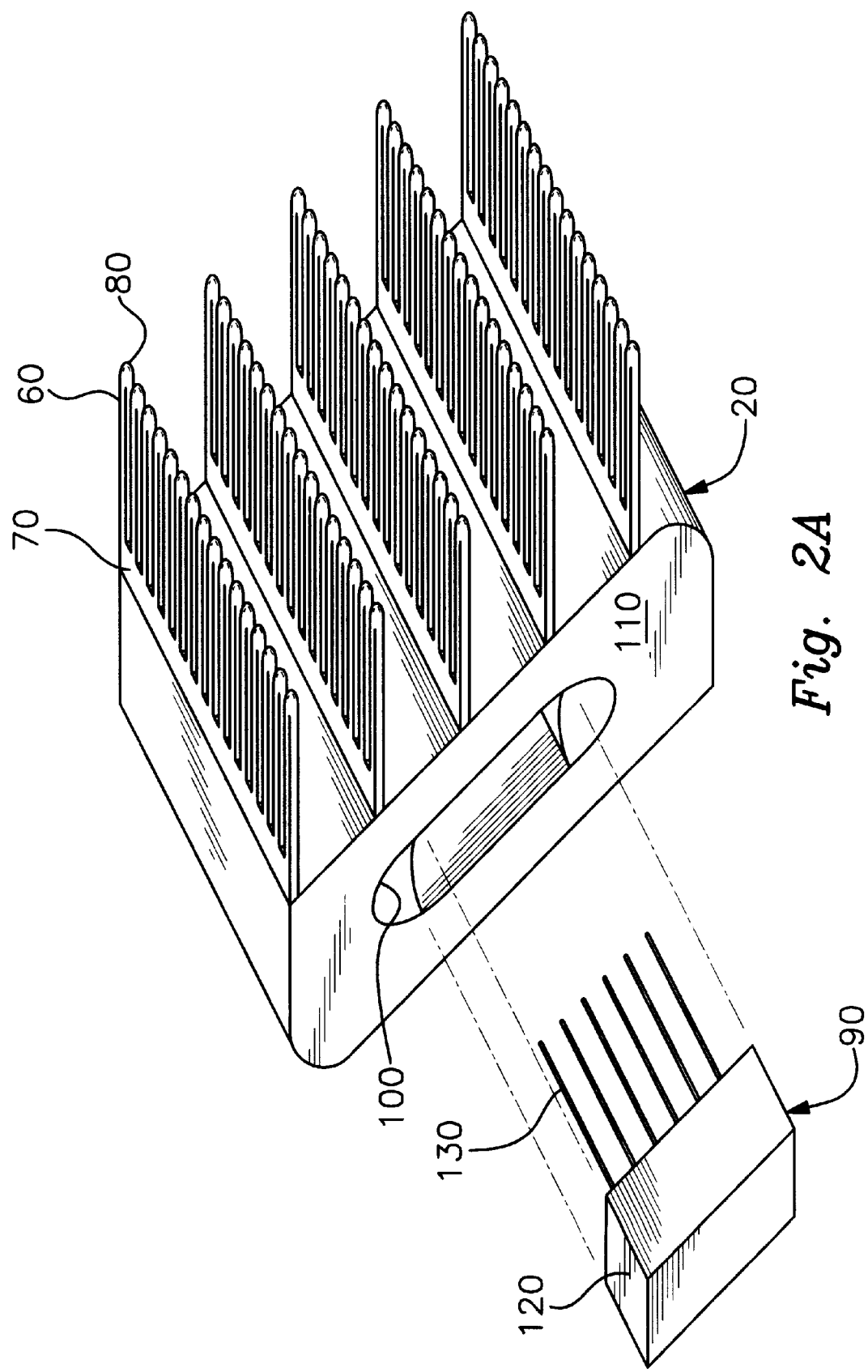
FIG. 2A is a perspective view of an alternate form of the second embodiment of the invention.

FIG. 2A discloses an alternate form of the preferred embodiment. A cleaning tool has a handle 90 that is slideably received into an aperture 100 formed in a side 110 of base 20. A plurality of cleaning tines 130 extend from handle 90. Cleaning tines 130 are dimensioned to pass between tines 60 of comb extensions 50a–d to permit removal of excess hair. Cleaning tines 130 are preferably constructed of an oxidation-resistant metal such as stainless steel. It is not necessary that cleaning tines 130 be rounded on their tips since they are utilized to remove excess hair from the apparatus and do not come into contact with the animal's epidermis.

In an alternative, unillustrated embodiment, face 30 of base 20 is concave to accommodate the curved surfaces of smaller animals. Another unillustrated embodiment includes tines 60 that have a progressively smaller circumference from backbone 70 to tip 80. This causes a compression of the hair passing through the tines and increases the pulling force. In addition, very large animals may require the use of a handle or structure (not shown) for gripping base 20 to access hard to reach areas.

Figure 3A:
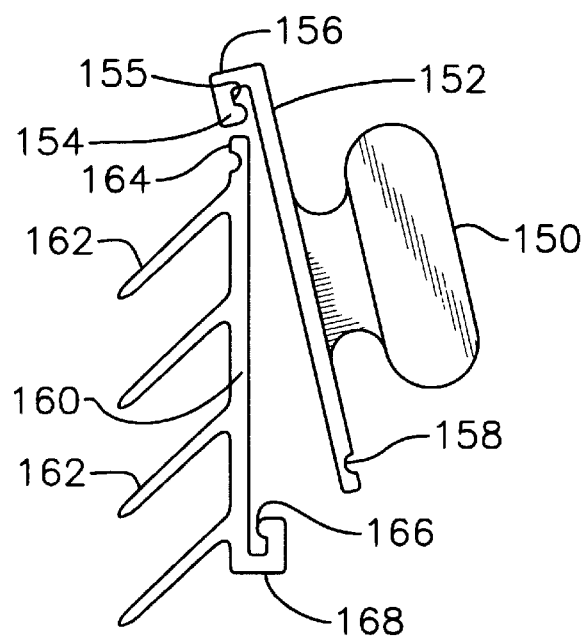
FIG. 3A is the first view of an animation depicting the assembly of a third embodiment of the invention in side elevation.
Figure 3B:
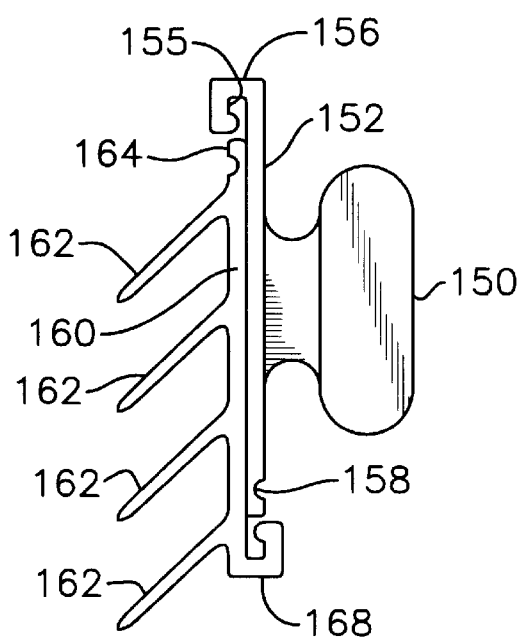
FIG. 3B is the second view in the animation.
Figure 3C:
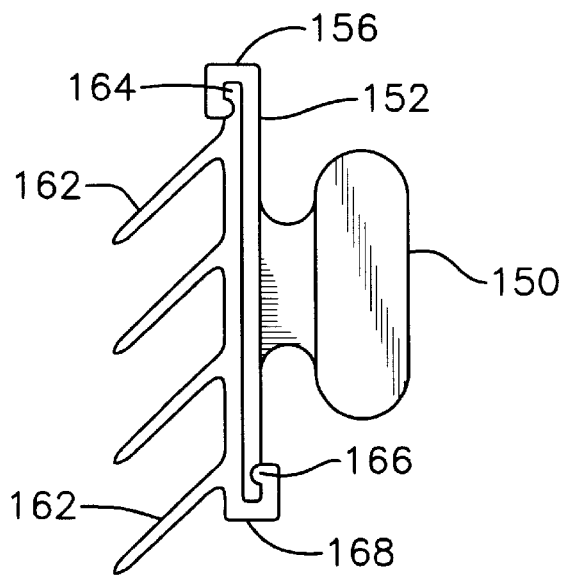
FIG. 3C is the third view in the animation.

The embodiment of FIGS. 3A–3C includes a handle 150 for gripping by a human hand and a clip member 152 of generally planar construction integrally formed with said handle. A first edge of clip member 152 has a first linear protrusion 154 formed in the free end of a hook-shaped engagement means 156 and said first linear protrusion 154 defines a first linear recess 155. A second edge of clip member 152 has a second linear recess 158 formed therein.

Base member 160 in this embodiment has a plurality of comb extensions 162 having individual tines as in the earlier-described embodiments. Comb extensions 162 are disposed at a common angle relative to base member 160 as in said earlier embodiments. A second linear protrusion 164 is formed along the extent of a first edge of base 160 and a third linear protrusion 166 is formed in the free end of a hook-shaped engagement means 168 formed in a second edge of said base member 160.

The above-described construction provides means for removably mounting clip member 152 to base member 160 when said two parts are brought together in the manner illustrated in the animation of FIGS. 3A–3C. More particularly, when the snap-fit assembly process has been completed, second linear protrusion 164 is received within first linear recess 155 and third linear protrusion 166 is received within second linear recess 158.

Figure 4:
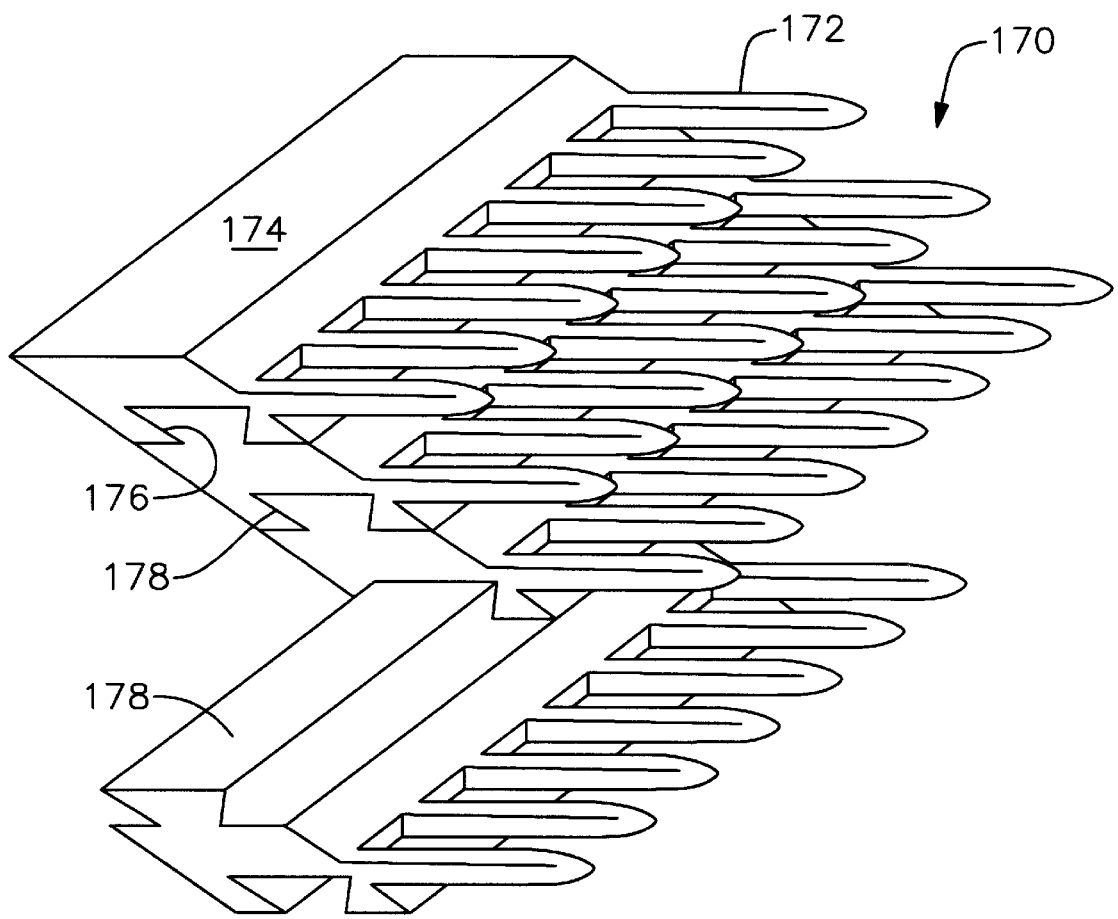
FIG. 4 is a perspective view of a fourth embodiment.

The fourth embodiment is denoted 170 as a whole in FIG. 4. Tines 172 of this embodiment are integrally formed with base sections 174, selected ones of which have a dove-tailed groove 176 formed therein that slidingly receives a tongue 178 of corresponding dimension and configuration formed on a contiguous base section. This enables the interlocking of any number of base sections 174 to provide a base member of any desired length. Each base section may have a tongue 178 and groove 176 formed therein on opposite sides thereof, but the base sections intended to be the end base sections may lack either a tongue or a groove, as indicated in FIG. 4.

Figure 5:
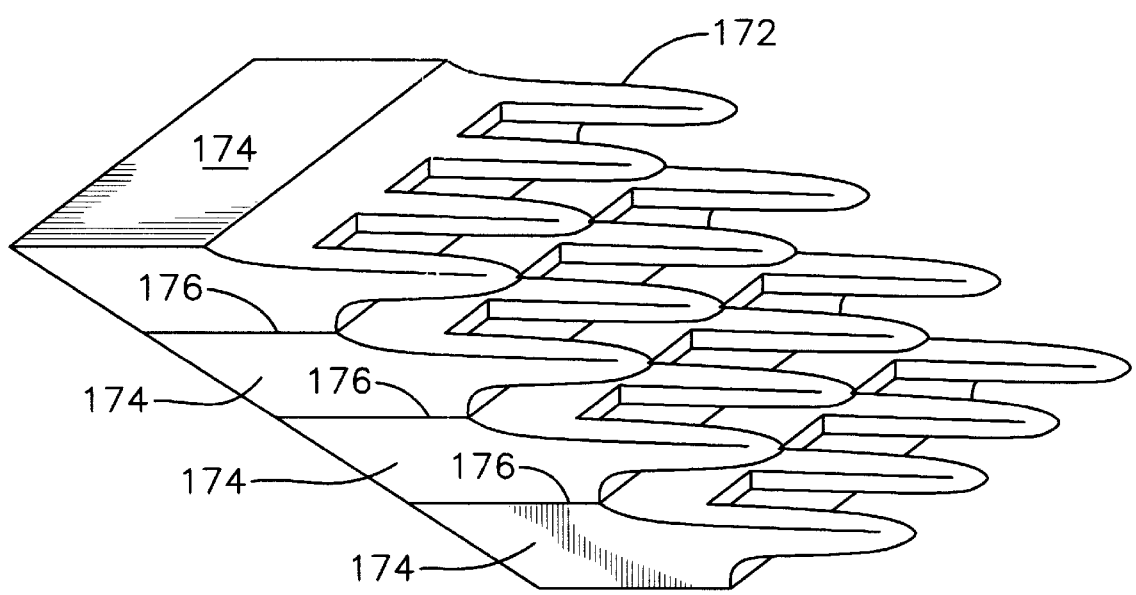
FIG. 5 is a perspective view of an alternative form of the fourth embodiment.

In the alternative form of the fourth embodiment depicted in FIG. 5, the individual base sections 174 are attached to one another by some means other than the tongue and groove arrangement of FIG. 4. For example, the base sections could have blind bores formed therein on one side and posts that press fittingly engage the blind bores formed in the other side. Moreover, the opposite sides could simply be flat with no tongues, grooves, blind bores, posts or other connection means formed therein and said flat sides could simply be adhered to one another by a suitable adhesive means.

Parting lines 176, which indicate that each base section 174 is independently formed, could also be eliminated by molding the embodiment of FIG. 5 in a single mold. FIG. 5 should therefore be construed as depicting a monolithic, one piece pet grooming tool, just like the embodiment of FIG. 2.

In a fifth embodiment (FIG. 6), base sections 174 are centrally apertured as at 175 and an elongate rod 180 having a cross-section that corresponds in dimension and configuration to the dimension and configuration of the central apertures is slideably received through said apertures to unite the base sections together. A first end of rod 180 may be capped as at 182 and a second end thereof may be capped as at 18. A blind recess 186 may be formed in each of said caps to accommodate the respective ends of rod 180.

Figure 6:
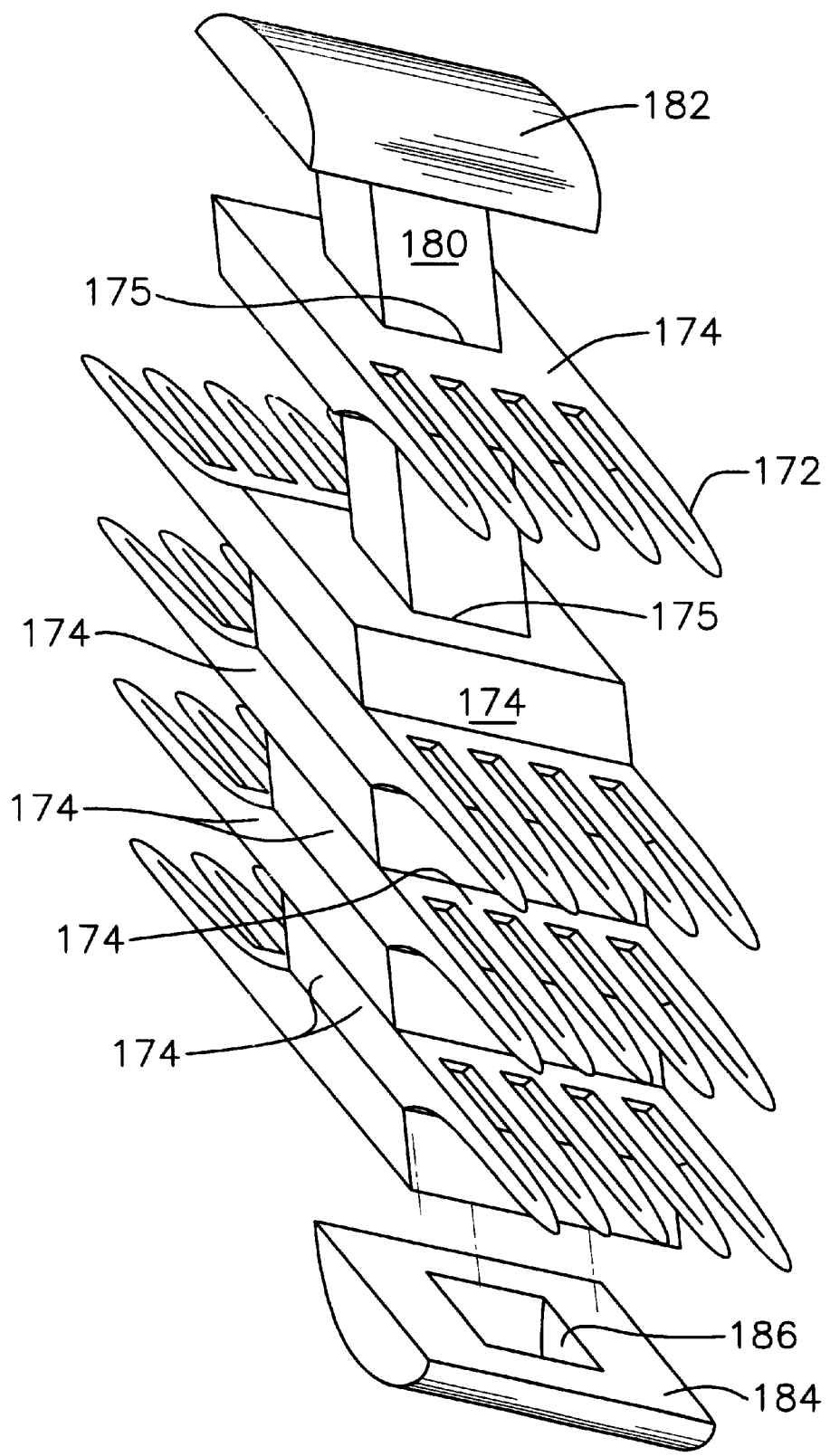
FIG. 6 is an exploded perspective view of the fifth embodiment.
Figure 7:
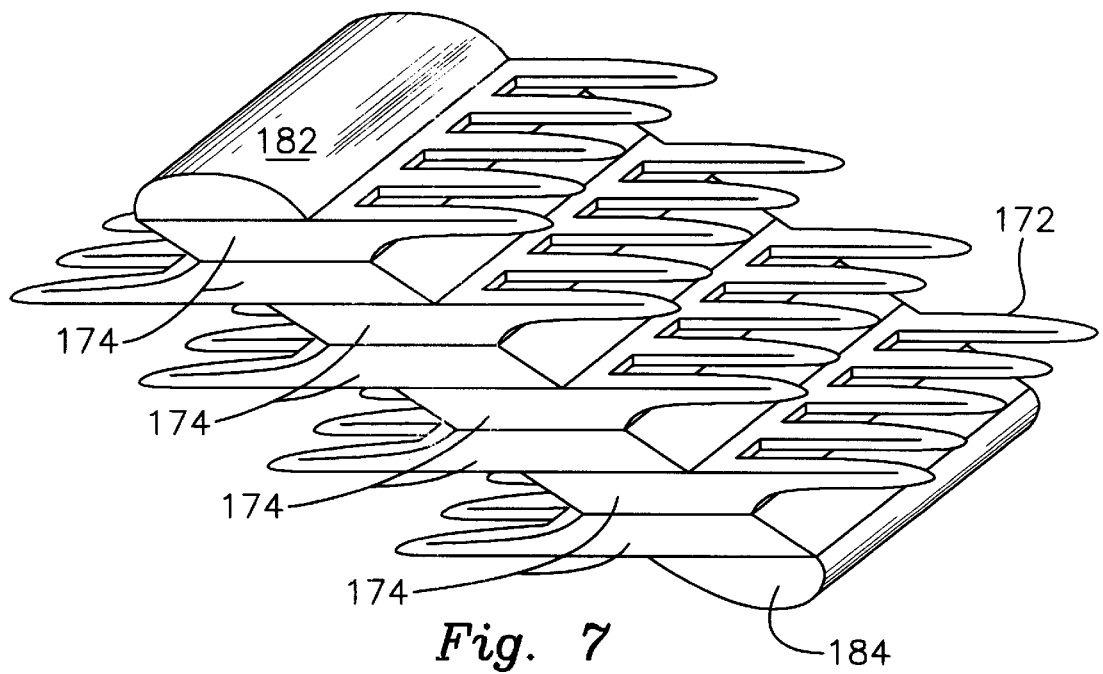
FIG. 7 is a perspective view of the fifth embodiment when in its assembled configuration.

FIG. 7 depicts the embodiment of FIG. 6 when in its assembled configuration.

Figure 8:
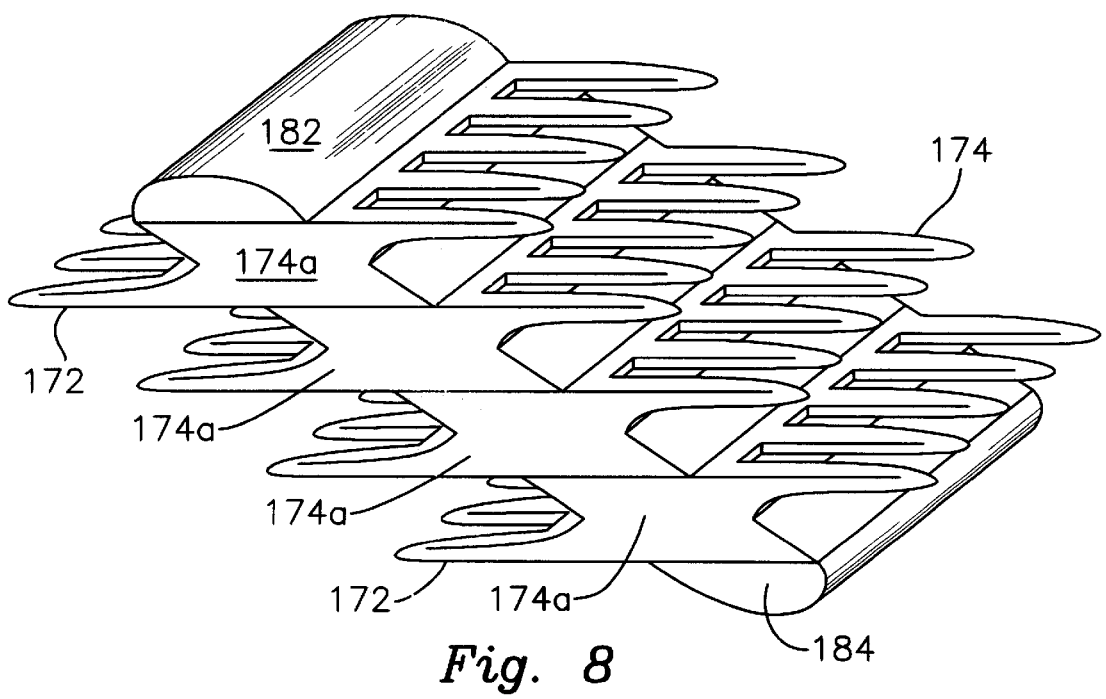
FIG. 8 is a perspective view of an alternative form of the fifth embodiment.

FIG. 8 depicts an alternative embodiment where the tines 172 that extend in opposite directions are formed on a common base section 174a instead of on individual base sections 174.

In all embodiments, it should be observed that each row of tines is angled with respect to the base in a common plane that is inclined at a predetermined acute angle relative to a plane perpendicular to said base.

The multiplicity of embodiments disclosed herein indicates that still further embodiments of the invention could be developed. However, the additional embodiments would merely be obvious variations of the embodiments already disclosed. Five primary embodiments and several alternative embodiments of the primary embodiments have been disclosed, making it clear that the claims that follow should be broadly interpreted to protect the heart or essence of the invention without strict limitation to the specific embodiments actually depicted.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An animal grooming apparatus, comprising:
   a base having a first side and a second side;
   a plurality of rows of tines extending from said base on said first side thereof;
   each row of tines forming a comb means;
   each row of tines being spaced apart from one another;
   each row of tines disposed at a predetermined acute angle with respect to said first side of said base; and
   each row of tines positioned in a common plane with one another, said common plane being inclined at said predetermined acute angle relative to a plane perpendicular to said base.

2. The animal grooming apparatus of claim 1, further comprising:
   a cleaning tool having a handle;
   a plurality of cleaning tines extending from said handle;
   an aperture formed in a preselected side of said base;
   said aperture sized to slideably receive said handle; and
   said cleaning tines dimensioned to pass through said tines of said row of tines.

3. The animal grooming apparatus of claim 1, wherein said tines of said row of tines extending from said comb extensions are tapered, with the circumference of said tines being greater proximate towards said base.

4. An animal grooming apparatus, comprising:
   a base;
   at least one slot formed in said base;
   a comb extension slideably received within said at least one slot;
   said comb extension having a plurality of tines positioned in a common plane, said common plane being inclined at an acute angle relative to a plane perpendicular to said base.

5. The animal grooming apparatus of claim 4 wherein said at least one slot includes a plurality of transversely disposed slots for receiving respective comb extensions, said slots being longitudinally spaced apart from one another.

6. The animal grooming apparatus of claim 5, wherein each of said comb extensions is constructed of polymer material.

7. The animal grooming apparatus of claim 4, wherein said base is constructed of polymer material.

8. The animal grooming apparatus of claim 4, wherein the angle of said comb extension is about 30 degrees from said base.

9. The animal grooming apparatus of claim 4, further comprising a second set of said slots and comb extensions on an opposite face of said base.

10. An animal grooming apparatus, comprising:
    a clip member of generally planar construction;
    a handle connected to said clip member, said handle adapted for gripping by a human hand;
    a base member having a plurality of comb extensions integrally formed therewith, each of said comb extensions having a plurality of individual tines;
    each of said comb extensions being disposed at a common angle relative to said base member; and
    means for removably mounting said clip member to said base member.

11. The animal grooming apparatus of claim 10, further comprising:
    a hook-shaped engagement means formed in a first edge of said clip member;
    a first linear protrusion formed in a free end of said hook-shaped engagement means;
    said first linear protrusion defining a first linear recess;
    a second linear recess formed in a second edge of said clip member;
    a second linear protrusion formed along an extent of a first edge of said base member and a third linear protrusion formed in the free end of a hook-shaped engagement means formed in a second edge of said base member, said third linear protrusion defining a third linear recess;
    whereby said base member is snap fittingly engageable to said clip member when said second linear protrusion is engaged to said first linear recess and when said third linear protrusion is engaged to said second linear recess.

12. An animal grooming apparatus, comprising:
    a plurality of base sections;
    each base section of said plurality of base sections having a row of tines integrally formed therewith;
    interlocking means for interlocking said plurality of base sections together;
    a base member collectively formed by said plurality of base sections that are interlocked;
    each row of tines projecting from a first side of its associated base section at a predetermined common angle relative to a plane of said base member; and
    each row of tines being transversely disposed with respect to a longitudinal axis of said base member.

13. The animal grooming apparatus of claim 12, wherein said interlocking means is formed in each of said base sections.

14. The animal grooming apparatus of claim 13, wherein said interlocking means includes a tongue formed in a first side of a predetermined number of base sections and a groove formed in a second side of a predetermined number of said base sections.

15. The animal grooming apparatus of claim 12, wherein said interlocking means is an adhesive.

16. The animal grooming apparatus of claim 12, wherein said interlocking means is a locking member formed separately from said base sections and said rows of tines formed integrally therewith.

17. The animal grooming apparatus of claim 16, wherein said locking member is an elongate rod, wherein each base section of said plurality of base sections is apertured to slidingly receive said elongate rod, and wherein said base member is collectively formed by a plurality of base sections disposed in abutting relation to one another along a predetermined extent of said elongate rod.

18. The animal grooming apparatus of claim 17, further comprising a cap member disposed at opposite ends of said elongate rod for retaining said base sections in abutting relation to one another along the extent of said elongate rod.

19. The animal grooming apparatus of claim 12, further comprising a second set of tines extending from a second side of each of said base sections at a common predetermined angle between 25 to 60 degrees relative to a plane of said base member.

20. The animal grooming apparatus of claim 12, wherein said common predetermined angle is about 30 degrees.

\* \* \* \* \*